United States Patent
Yokota et al.

(10) Patent No.: US 7,252,436 B2
(45) Date of Patent: Aug. 7, 2007

(54) ROLLER BEARING CAGE AND METHOD OF PRODUCING THE SAME

(75) Inventors: Yasunori Yokota, Kamakura (JP); Kengo Hidano, Kamakura (JP); Shouji Nagao, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 113 days.

(21) Appl. No.: 11/055,632

(22) Filed: Feb. 11, 2005

(65) Prior Publication Data

US 2005/0185874 A1    Aug. 25, 2005

(30) Foreign Application Priority Data

Feb. 23, 2004  (JP) .............................. 2004-045814
Aug. 26, 2004  (JP) .............................. 2004-246396

(51) Int. Cl.
*F16C 33/46* (2006.01)
(52) U.S. Cl. .................................................... 384/580
(58) Field of Classification Search ................ 384/580, 384/576, 572
See application file for complete search history.

(56) References Cited

U.S. PATENT DOCUMENTS 5,540,506 A * 7/1996 Yokota et al. .............. 384/580
6,196,728 B1 * 3/2001 Wahler et al. .............. 384/580
6,767,135 B2 * 7/2004 Yokota ....................... 384/580

FOREIGN PATENT DOCUMENTS

| JP | 8-219149 | 8/1996 |
|----|----------|--------|
| JP | 9-236130 | 9/1997 |
| JP | 9-242763 | 9/1997 |

* cited by examiner

*Primary Examiner*—Lenard A. Footland
(74) *Attorney, Agent, or Firm*—Browdy and Neimark, PLLC

(57) ABSTRACT

A roller bearing cage is disclosed, which is provided inexpensively from basic minimum quantity of row material. The roller bearing cage is made with a production method using rolling operations, which is the absence of the formation of chips, while ensuring the strength and stiffness of the cage. A circular inside surface of the cage is made to give an advantage to the rolling operations. The circular inside surface is circularly recessed to have a concaved surface of just one radius of curvature R. A diametral dimension across diametrically opposing bottoms of the circular recess is made larger than the pitch circle distance P.C.D. Pillars of the cage have inside retainer lips, which are hard to make any engagement with their associated rollers, which might worsen the engine performance.

4 Claims, 12 Drawing Sheets

ROLLER BEARING CAGE AND METHOD OF PRODUCING THE SAME

FIELD OF THE INVENTION

The present invention relates to a roller bearing cage serving as parts for engines. Still more particularly, the invention is concerned with a roller bearing cage suitable for use in a larger end, commonly referred to as rod "big end", of a connecting rod in an engine and a method of producing the same.

BACKGROUND OF THE INVENTION

There have been conventionally developed many types of roller bearing cages usable in the rod "big end" of the connecting rod in the engines. An example of conventional bearing cages as stated earlier is disclosed in, for example Japanese Patent Laid-Open No.1996-219149. The prior roller bearing cage is made in a configuration resembling any gate in cross section where the circular inside surface of the roller bearing cage is recessed to form roughly U shape. The prior roller bearing cage is composed of a nearly cylindrical cage made up of axially opposite annular members and pillars integral with the annular members and positioned at regular intervals around the circular surface of the cage to provide pockets, and rollers received in the pockets, one to each pocket. With the prior roller bearing cage constructed as stated earlier, moreover, coining operation is applied to the pillars to make outside retainer projections extending partially into their associated pockets to keep the rollers against falling radially outwards away from the bearing cage. Then, any material removal operation is carried out around the circular outside surface of the cage to erase completely depressions caused corresponding in reverse to the retainer projections, making the radially outside surfaces of the retainer projections very close to the prescribed outside diameter of the bearing cage. Thus, the outside retainer projections to keep the rollers against falling away from the cage are made around the circular outside surface of the cage in a way their outside surfaces fit together the circular outside surface of the bearing cage. Moreover, the pillars of the bearing cage are arranged in such a manner that their outside surfaces are flush with the circular outside surfaces of the annular members across their substantially overall length in the axial direction. The pillars are cut away at their axially middle areas to make the pockets spaced out wide. The outside retainer projections to keep the rollers against outward escape out of the cage are placed in a way lying on the circular outermost surface of the bearing cage. With the prior roller bearing cage constructed as recited earlier, even if the guide surfaces of the bearing cage against which the rollers are carried for rolling motion are somewhat worn away during installation in the engine, the rollers are positively kept against direct engagement with the associated retaining projections, so that the bearing is effectively protected against getting seized up. With the prior roller bearing cage in which the outside retainer projections are made in a way their outside surfaces are flush with the circular outside surface of the bearing cage, the outside retainer projections help increase in area the overall circular outside surface of the bearing cage. Instead, the surface-to-surface contact stress of the bearing cage against any mating counterpart thereof is made reduced so that the roller bearing is kept against seizure. The prior roller bearing cage is designed to carry effectively the loads imposed by modern high-speed engines because of the constructional features as recited earlier.

Another example of the roller bearing cage having a gate-like configuration in cross section is disclosed in, for example Japanese Patent Laid-Open No.1997-236130. The prior needle bearing cage is envisaged ensuring accuracy of the guide surfaces boarding the pockets against which the rollers are carried for rolling motion, even without any subsequent post-working operation, thereby making a further refinement to precision even with production cost savings. With the needle bearing cage recited earlier, the circular surface inside of the bearing cage is made up of inside surfaces of the middles small in thickness, and inside surfaces of the axially opposite sides, which merges together with the middles through ramps inclining towards the axial center of the cage. The guide surfaces around the pockets against which the rollers are carried for rolling motion is constituted with sheared edges lying on the pitch circle distance P.C.D.

Moreover, a prior production method of the roller beating cage is also disclosed in, for example Japanese Patent Laid-Open No.1997-242763 In which the rolling element raceways are made inside the outer ring with using rolling operation. In the prior production method recited earlier, a ring-like blank is heated up to a prescribed temperature to form austenite, and then cooled down at rapid cooling rate. The ring-like blank remaining in austenite is subject to the rolling operation, and thereafter cooled down to a temperature below Ms point where the austenite transforms to form martensite to be hardened to above 57 Rockwell C.

Meanwhile, as the modern engines are remarkably refined in efficiency and performances to get further higher in horsepower, the roller bearing cage for the powerful engines has to be made so as to stand up to further high-speed revolution, even with cost savings and more friendly to environment in the production thereof. The roller bearing cages of the type recited earlier are used extensively for the engines and verified they successfully work with better durability. With the prior roller bearing cage made in a configuration resembling any gate in cross section where a ring-like blank is turned on lathe to cut a circular inside surface of the blank into roughly U-shape in cross section, nevertheless, as the cage would sometime made uneven in thickness, the surface-to-surface contact stress of the bearing cage against the circular surface inside the big-end bore trends to result in any harsh condition during installation in the rod "big-end" of the connecting rod in engines. Further, the turning operation carried out on the lathes to finish the cage blank into the desired contour would take substantial time and effort, while involving cutting much excess metal, in the form of chips, from the cage blank. This means that the prior manufacturing process for the roller bearing cage produces in vain much metal waste in the form of chips or debris, which should be disposed properly. Besides, the prior cages constructed as stated earlier, because of their configuration like any gate having U-shape much bumpy with many angular corners, is very tough to machine them by the turning operation on the cage blank.

The prior needle bearing cage recited earlier, as with the roller bearing cage as stated just above, has the circular inside surface including the inside surfaces of the middles small in thickness and other inside surfaces of the axially opposite sides, which merges together with the middles through ramps inclining towards the axial center of the cage. The cage construction as recited above has an adverse tendency to cause somewhat increased surface-to-surface contact stress that might take place between the bearing cage and the circular inside surface in the big-end bore of the connecting rod. In addition, the prior needle bearing cage constructed as stated earlier is also tough to produce it by the turning operation on the cage blank, because the circular inside surface is made in the angularly bumpy configuration, which consists of the inside surfaces of the middles small in thickness, and other inside surfaces of the axially opposite sides merging together with the middles through ramps inclining towards the axial center of the cage. The prior needle bearing cage is further unsuited to handle it since the cage has no construction favorable for positively retain the associated needles.

The production method of the roller beating cage recited earlier using the rolling operations to manufacture the race ring, because of requiring highly skilled effort of rolling operation, is hard to work the cage with high accuracy in roundness, concentricity, and so on.

SUMMARY OF THE INVENTION

The present invention has for its primary object to resolve the major problems as stated earlier, and to make a further development of the roller bearing cage disclosed in the senior application of common assignment, which is recited earlier in "background of the invention", to provide a roller bearing cage well applicable to the high-compression, high-speed engine, with more inexpensive production costs. The constructional features of the present invention reside in a turning operation on the lathe at the initial step to generate a cage blank, and a configuration of the cage with inside retainer projections unique in construction finished using a rolling operation other than the turning operation. More particularly the present invention is to provide a roller bearing cage favorable for the bearings, which are needed to stand up to the harsh conditions imposed by advanced high-compression, high-speed engine, and also to provide a production method of a roller bearing cage with using a rolling operation, which is substantially more friendly to the environment because of conserving row stock of material while cutting hours to make the desired bearing cage, and also because of the absence of the formation of chips. Thus, the production method according to the present invention makes it possible to provide inexpensively the desired roller bearing cage from basic minimum quantity of row material.

The present invention is concerned with a roller bearing cage comprising a cage made up of a pair of annular members arranged in a way spaced axially apart from each other and extended circumferentially in parallel with each other, pillars integral with the annular members and positioned at regular intervals around circular surfaces of the cage to provide pockets between any two adjacent pillars, and rollers received in the pockets, one to each pocket; wherein an circular outside surface of the cage is made even across an overall length in the axial direction while a circular inside surface of the cage is made circularly inside recessed to provide a configuration of concaved surface.

In another aspect of the present invention, a roller bearing cage is disclosed in which the concaved surface is made around the circular inside surface of the cage with using any one of rolling operation and turning operation in such a manner that a diametral dimension across diametrically opposite deep bottoms of the concaved surface is set larger than a diametral dimension across pitch circle on the rollers.

In another aspect of the present invention, a roller bearing cage is disclosed in which the concaved surface defining the circular inside recess is made in line with an imaginary circle having just one radius of curvature when viewed in transverse section in an axial direction of the cage. As an alternative, the concaved surface defining the circular inside recess is made into a contour of curved surface when viewed in the transverse section in the axial direction, in which a straight line joins two imaginary curves having the same radius of curvature. As a further another alternative, the same radius of curvature for the concaved surface of the circular inside recess is about 6 mm, while the straight line has a length equivalent to a diameter of the roller.

In another aspect of the present invention, a roller bearing cage is disclosed in which the pillars of the cage have outside retainer lips to keep the rollers against falling away outwards and inside retainer lips to keep the rollers against falling away inwards. In another aspect of the present invention a roller bearing cage is disclosed in which the outside retainer lips have outside surfaces that are made flush with the circular outside surface of the cage.

In a further another aspect of the present invention, a roller bearing cage is disclosed in which the inside retainer lips are made correspondingly in reverse to depression of raised ridges in a way there come flush with the circular inside surface of the cage, the raised ridges lying along axially opposite edges of the circular recesses inside the pillars. As an alternative, the inside retainer lips are provided correspondingly in reverse to circular depressions that have in advance prepared around the circular inside surface of the cage along the axially opposite edges of the circular recesses inside the pillars.

In another aspect of the present invention, a roller bearing cage is disclosed in which the pillars each include axially opposite thick portions and a slender portion lying between the axially opposite thick portions and decreasing gradually in thickness, so that guide surface against which the associated roller is carried for rotation is constituted with in part the thick portions and in part the slender portion adjoining the thick portions.

The present invention is further concerned with a method of producing a roller bearing cage comprising steps of; shearing a tubular material into a ring-like blank; processing the ring-like blank by rolling operation into a rolled product of cage contour where there is formed a circular inside recess of semicircular contour in transverse section in axial direction of the cage; working the rolled product by punching operation so as to have more than one pocket for receiving the roller therein, which are spaced circularly away from one another; further working the punched product with pockets into a formed product in which raised ridges are made on the pillars between two adjoining pockets preparatory to the inside retainer lips to keep the rollers against falling away from the cage; processing the formed product by turning operation to face flat surfaces on the axially opposite sides of the formed product, yielding a turned product; heating the turned product into a heat-treated product high in durability; further working the heat-treated product by turning operation to finish a circular outside surface thereof into a final form of a prescribed outside circumferential dimension; and processing the turned product of the prescribed outside circumferential dimension by surface treatment to provide a finished cage enhanced in durability.

In another aspect of the present invention, a production method of the roller bearing cage is disclosed in which the rolled product of the cage contour formed by the rolling operation has the circular inside recess shaped into the semicircular concaved surface. Moreover, the rolled product is made with a circular inside raised ridge to provide an inside retainer lip around the circular inside surface of the cage.

With the roller bearing cage constructed as stated earlier, the circular inside recess made around the circular inside surface of the cage is formed to have the concaved surface that is easier to work it by any one of the turning operation and the rolling operation, even with inexpensive production cost. The roller bearing cage of the present invention is expected to display desired performance tolerant to the high-speed engines when installed in the rod "big-end" of the connecting rod of the engine. The roller bearing cage of the present invention is envisaged making the surface-to-surface contact stress more uniform across the overall circular outside surface of the cage, and also rendering the cage less in weight to reduce the surface-to-surface contact stress that might be exerted on the cage. Since the rollers are kept in the cage with the outside and inside retainer lips for free rotation, but against falling away out of the cage whether inside or outside, the roller bearing cage making sure of keeping the rollers against falling away is much easier to handle it upon installation of the roller bearing cage into mating connecting rod in the engine. The roller bearing cage, as undergoing revolving force as well as centrifugal force, is born or guided predominantly on the circular outside surface of the cage. The cage recessed around the circular inside surface thereof to have the concaved surface helps stave off any locally lopsided surface-to-surface contact stress, which might otherwise occur on the circular outside surface of the cage, and also render the weight of the cage as small as possible, lessening the surface-to-surface contact stress imparted on the cage. As a result, the roller bearing cage of the present invention is more tolerant to the high revolution of the engine, compared with the prior roller bearing cage.

The roller bearing cage in which the cage is processed with using a rolling operation present invention may be provided inexpensively from basic minimum quantity of row material, compared with the cage worked on the lathes by the turning operation. The rolling operation where the circular surface inside the cage blank is subjected to the compressive working by rolls is preferable to ensure the strength and stiffness of the cage, and substantially more friendly to the environment because of the absence of the formation of chips. With the roller bearing cage constructed as stated earlier, the circular inside surface of the cage is designed into the specific contour, which would be worked easily by the rolling operation, more particular, the concaved surface semicircular in transverse section in the axial direction of the cage. Moreover, the inside retainer lips lying in flush with circular inside surface of the cage are preferable for the rolling operation and also result in such construction that they are hard to make any engagement with their associated rollers, which might worsen the engine performance.

According to the present invention, consequently, the roller bearing cage improved in performances including stiffness, strength, and so on of the cage itself may be provided from basic minimum quantity of row material, with using the working operation that is substantially more friendly to the environment and more expensively because of conserving row stock of material while cutting hours to make the desired bearing cage, and also because of the absence of the formation of chips. In forming the inside retainer lips to the cage for the roller bearing cage according to the present invention, inside raised ridges are first formed simultaneously with the rolling operation and, then, the inside raised ridges are easily finished by the pressing operation into the inside lips that are flush with the circular inside surface of the cage. The construction in which the inside retainer lips are made flush with the circular inside surface of the cage helps render the rollers harder to make any engagement with the inside retainer lips, compared with the prior roller bearing cage. The constructional feature that the rollers are hard to make engagement with the inside retainer lips results in keeping the cage against any occurrence of seizing during high revolution of the engines, realizing improvement in engine performance.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
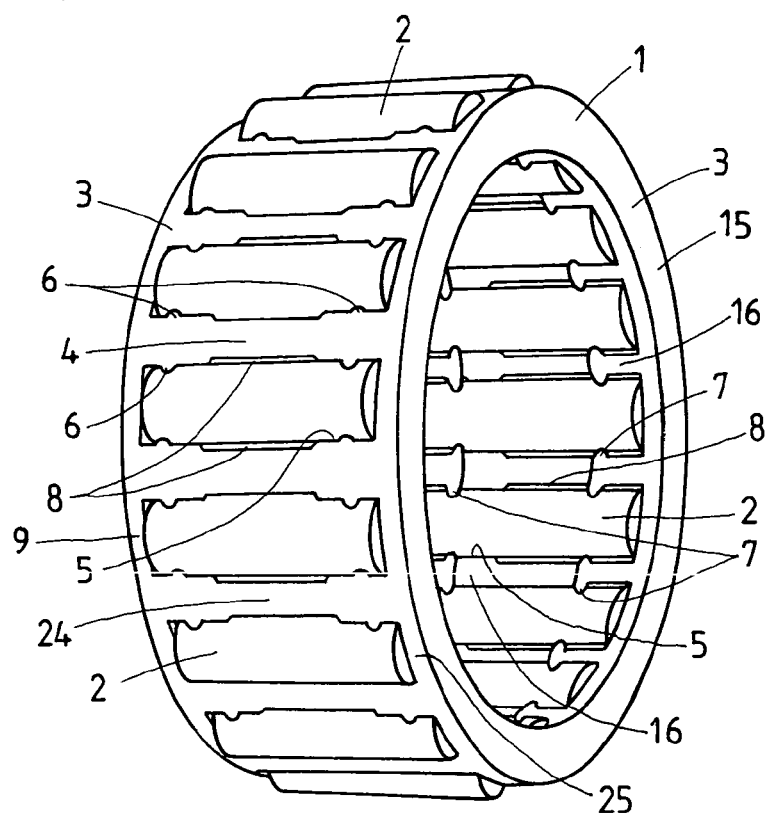
FIG. 1 is a perspective view showing a preferred embodiment of a roller bearing cage according to the present invention.

A roller bearing cage and a method of producing the same according to the present invention will be explained below with reference to the accompanying drawings. The roller bearing cage according to the present invention discussed later is adapted for use in machines such as engines, and so on, especially in a rod "big end" of the connecting rod in the engine. Referring to FIGS. 1 to 4, a roller bearing cage of the present invention will be described below in detail.

The roller bearing cage of the present invention is mainly comprised of a cage 1 and rollers 2, commonly referred to as "needle", which fit in the cage 1. The cage is composed of a pair of annular members 3 spaced away from one another in axial direction with extended circularly in parallel with one another, and a plurality of pillars 4 made integral with the annular members 3 and positioned at regular intervals around the circular surfaces of the annular members 3 to form pockets 5 between any two adjacent pillars 4. The rollers 2 fit for rotation in the pockets 5, one to each pocket. Axially opposite circular end surfaces of the cage 1 are constituted with axially opposing circular sides 15 of the paired parallel annular members 3.

The cage 1 is made in a substantially cylindrical shape in which many pockets 5 extending in axial direction in parallel with one another are each defined between any two adjacent pillars 4 that are spaced away from each other circularly at prescribed intervals. The pocket 5 has a width circumferentially of the cage, which is made somewhat larger than an outside diameter of the roller 2, except specific areas spanning across outside retainer lips 6 to keep the associated roller 2 against falling away out of the pocket 5. Moreover, the roller 2 has a diameter larger than a thickness of the cage 1. The pillars 4 are all made in a way their outside surfaces 24 extending across substantially overall length in the axial direction are flush with circular outside surfaces 25 of the annular members 3. Thus, a circular outside surface 9 extending around the cage 1 forms entirely a hollow right cylinder, which is made open only at pockets 5. The cylinder constructed as stated above, when installed in the big-end bore of the connecting rod, can make surface contact across large area with a circular surface inside the big-end bore. The larger the contact area of the cage with the mating member thereof is, the less the surface-to-surface contact stress between them is, so that heat and wear encountered at the surface-to-surface contact area might be remarkably curbed.

Figure 3:
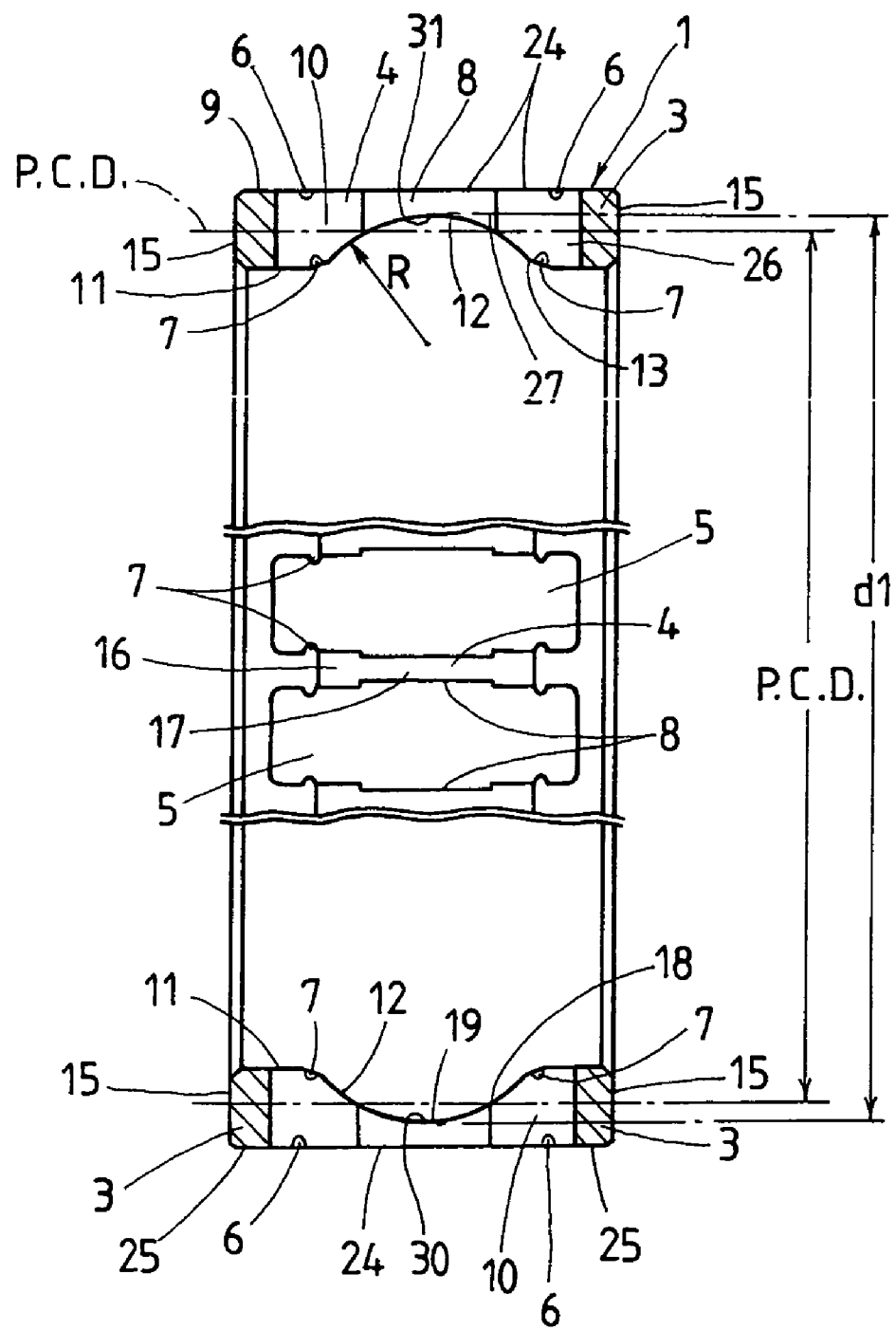
FIG. 3 is a view in transverse section taken along an axial direction, partially broken away, of the roller bearing cage in FIG. 1 as seen looking into the inside thereof.
Figure 4:
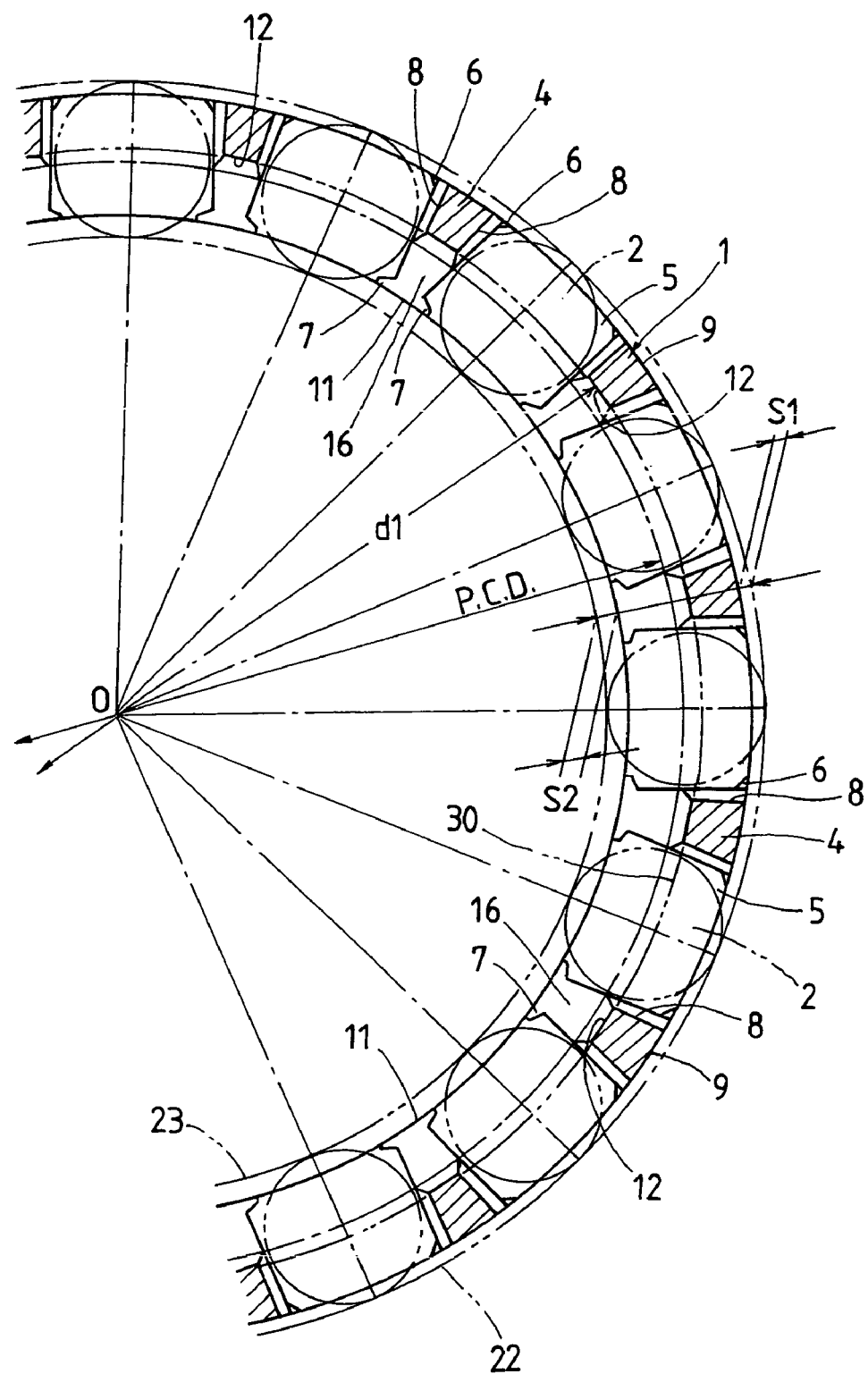
FIG. 4 is an enlarged fragmentary view in cross section taken along a radial direction, illustrating roughly semicircular cage half of the roller bearing cage of FIG. 1.

The pillars 4 of the roller bearing cage 1, as shown in FIGS. 3 and 4, are each recessed at 12 on a curved inside surface thereof across a major middle portion in an axial direction of the cage 1. The recess 12 is so made as to sink deep radially outwards of the cage 1 beyond a diameter P.C.D. of pitch circle having a center lying on a axis 0 of the roller bearing cage. Moreover, the recess 12 is formed to have a semicircular concave surface 18 when viewed in axial cross section, which extends across an axial length less than that of the associated pocket 5 with a radius of curvature R. The pillars 4 are each made up of axially opposite thick portions 26 joining together with their associated annular members 3, and a slender middle portion 27 lying between the axially opposite thick portions 26, the slender middle portion 27 decreasing gradually in thickness towards the axial center thereof. The slender middle portion 27 interposed between axially opposite thick portions 26 is partially provided on circumferentially opposing sides thereof with smooth guide surfaces 10 with which the associated rollers 2 make rolling-contact to be carried smoothly against the guide surfaces 10.

While the pillars 4 are made concaved on their inside surfaces to form the semicircular recesses 12, the pillars 4 are also positioned with their outside surfaces 24 being flush with the circular outside surfaces 25 of the annular members 3. Thus, the pillars 4 are combined with the axially opposite annular members 3 to form a configuration resembling an arched gate when viewed in transverse section along the axial direction of the cage 1. The cage 1 of arched gate-type in transverse section, as ensuring substantial modulus of section, makes certain of sufficient stiffness, even with less weight. With the cage 1 of arched gate-type in transverse section constructed as stated earlier, moreover, the rollers 2 are guided properly by their associated pillars 4, especially at axial areas extending across the axially opposite thick portions 26 and some parts of the slender middle portion 27, which are placed next to the axially opposite thick portions 26. Thus, the guide effect of the pillars 4 allows the rollers 2 to roll certainly with not only less skew but also less sliding movement against raceways 22, 23, thereby helping minimize heat. With the cage 1 of arched gate-type in transverse section of the present invention, in addition, the pillars 4 are each made relatively less in width extending on the pitch circle diameter P.C.D. of the cylindrical roller bearing cage. The constructional featg an axial direction, partially broken away, of a further another version of the roller bearing cage according to the present invention as seen looking into the inside thereof.

DETAILED DESCRIPTION OF THE PREFERRED EMBODIMENTS

Figure 2:
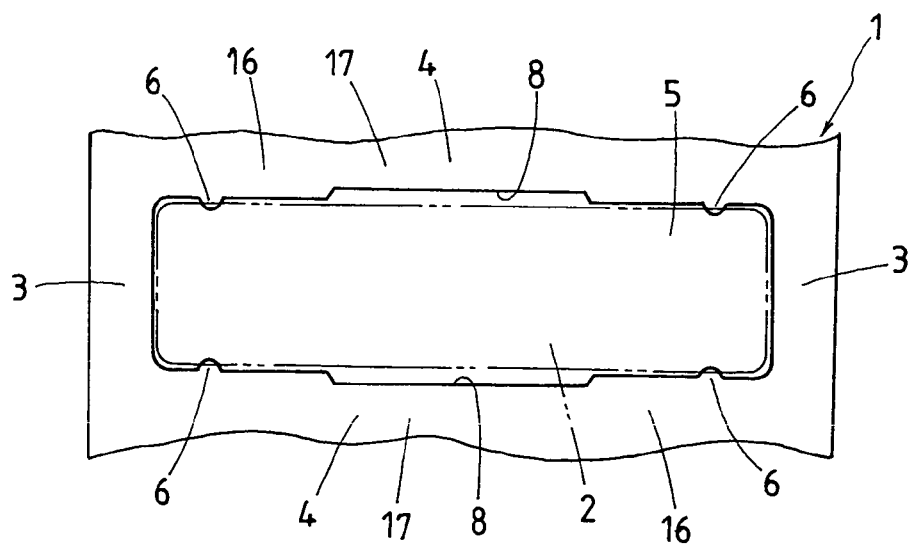
FIG. 2 is a fragmentary plan view illustrating any one pocket made in the roller bearing cage shown in FIG. 1.

A roller bearing cage and a method of producing the same according to the present invention will be explained below with reference to the accompanying drawings. The roller bearing cage according to the surface thereof with a pair of inside retainer lips 7, which are made on the inside surface of the pillar 4 at boundaries between the axially opposite thick portions 26 and the slender middle portion 27 in a way spaced away from one another in axial direction. The cage 1 is also provided on a circular outside surface thereof with a pair of outside retainer lips 6, which are made in rough opposition to the inside retainer lips 7. The inside and outside retainer lips 6, 7 all extend into their associated pockets 5 to such extent that tips of the retainer lips 6, 7 extending towards one another from any two pillars 4 adjacent to one another in circumferential direction of the cage 1 are apart from each other with leaving an interval just slightly less than the diameter of the roller 2. Thus, the rollers 2 are constrained by the outside retainer lips 6 so as not to veer radially outwards of the cage 1 while by the inside retainer lips 7 as so to wobble radially outwards. As a result, the rollers 2 are kept against falling away out of the cage 1. The pillar 4 is partially cut out along circumferentially opposite sides thereof at axially middle area 8 over a prescribed length in the axial direction of the cage 1 to make a narrow area 17 less in width than rest 16 of the pillar 4, thereby enlarging partially the pocket 5 in widthwise direction thereof corresponding in reverse to cutout on the associated pillars 4. The pocket 5 enlarged over the axial middle areas thereof serves to improve the capacity to introduce lubricant into the roller bearing cage. The roller bearing cage in which the pocket 5 is widthwise enlarged over the axially middle area 8 thereof, when installed in the big-end bore of the connecting rod, can make certain of better lubrication. With the roller bearing cage of the present invention constructed as shown in especially FIG. 3, the circular outside surface 9 of the cage 1 is made flush or even across the overall axial length thereof, whereas the circular inside surface 11 of the cage 1 is worked using rolling operation to form the recess 12 of semicircular contour when viewed in transverse section in the axial direction. Another constructional feature of the cage 1 resides in that an imaginary circle 30 lying circumferentially on successive bottoms 31 of the semicircular inside recesses 12 around the axial center 0 of the cage 1, as shown in FIGS. 3 and 4, has a diametral distance dl, which is the maximum inside diameter larger than the pitch circle distance P.C.D. of the roller bearing cage. Contour of the concaved surface 18 defining the recess 12 on t he inside surface of the pillar 4, as shown in FIG. 3, is in line with an imaginary curve 19 having just one radius of curvature R when viewed in the transverse section in the axial direction of the cage 1. The inside retainer lips 7 on the pillar 4 to keep the rollers 2 against falling away inwards out of the cage 1 are made in flush relation with the circular inside surface 11 of the cage 1. With the roller bearing cage constructed as stated earlier of the present invention, the circular outside surface 9 of the cage 1 save for specific areas where the pockets 5 are made open is overall made even while the pillars 4 of the cage 1 is formed with the outside retainer lips 6, which is extended into the associated pockets 5 to keep the rollers 2 against falling outwards away from the cage 1, with being made flush with the circular outside surface 9 of the cage 1. The pillars 4, as shown in FIG. 2, are partially cut out at 8 along their circumferentially opposite sides at axially middle areas over a prescribed length in the axial direction, thereby enlarging partially the associated pockets 5 in widthwise direction thereof corresponding in reverse to cutout 8 on the associated pillars 4. This constructional feature helps make certain of better lubrication.

Figure 5:
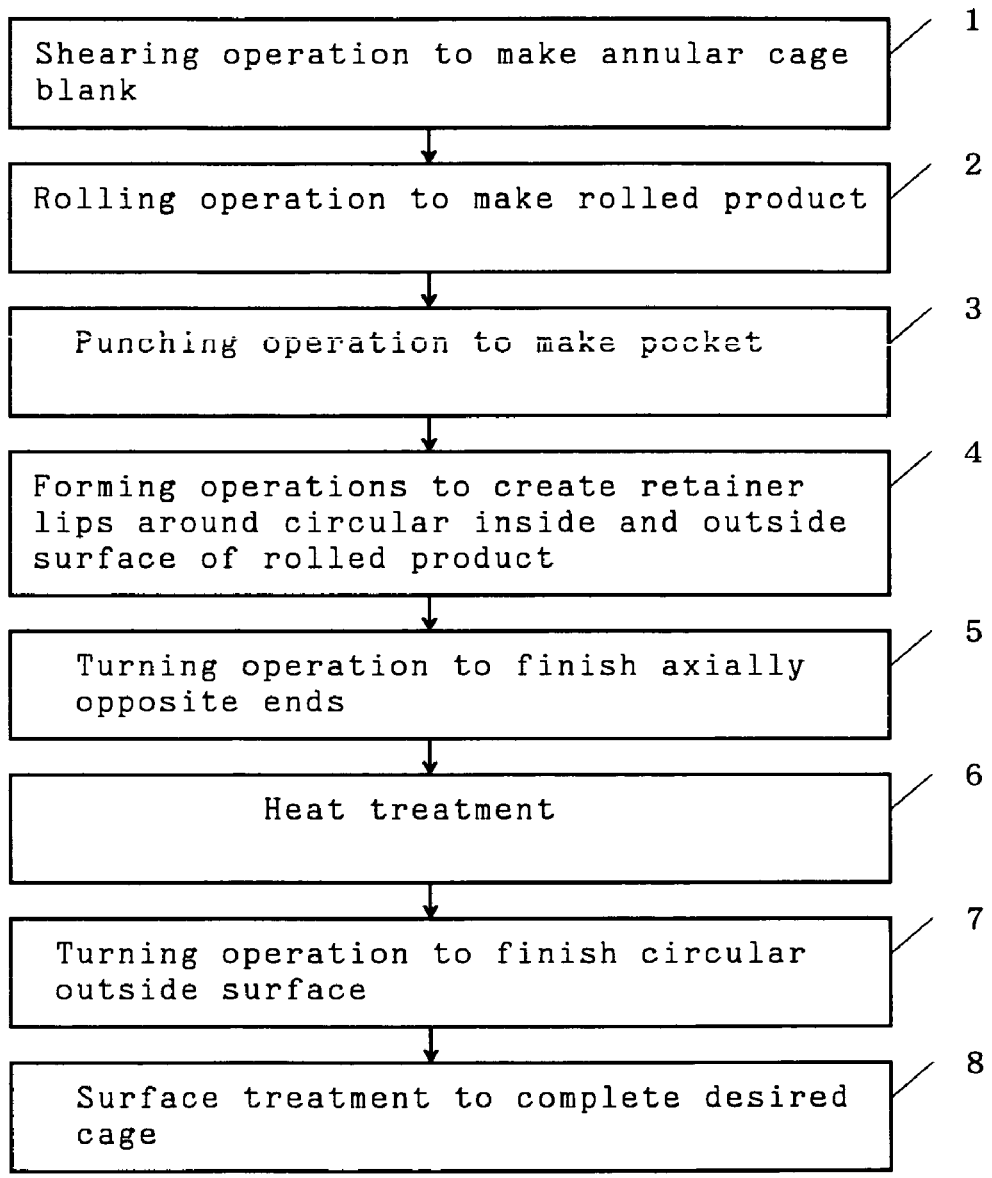
FIG. 5 is a block diagram explaining procedures to produce the roller bearing cage in FIG. 1.

The concaved inside surface 18 defining the recess 12 in the roller bearing cage of the present invention has a contour that will be worked well by a rolling operation shown in FIG. 5. In contrast, the prior roller bearing cage disclosed in the senior patent application of common assignment, which has been recited earlier in the present specification, had the angularly recessed inside surface that was worked by the turning operation on the lathe other than the rolling operation. With the roller bearing cage of the present invention, the concaved surface defining the recess on the inside surface of the pillar 4 is made so as to have the contour in transverse section, which is in line with an imaginary curve 19 having just one radius of curvature R. The curved surface involving no angularly cut surface would make certain of allowing lubricant to flow evenly over the concaved inside surface, ensuring better lubrication. The imaginary circle 30 lying circumferentially on successive deep centers of the inside recesses 12, or the bottoms of the inside recesses 12, around the axial center 0 of the cage 1 has a diametral distance dl, which extends radially outside beyond the pitch circle distance P.C.D. of the roller bearing cage. The pillars 4, although scooped deep midway between their axially opposite ends, ensure sufficient stiffness and strength because of done by the rolling operation. This contributes to weight saving of the cage 1, thereby alleviating the centrifugal load at the big end of the connecting rod in the engine, which might b e imposed by the high-speed revolution. The rollers 2, as making rolling contact with part the axially opposite thick portions 26 and part the slender middle portion 27 of the pillars 4, are carried with less skew.

The roller bearing cage of the present invention, as shown in FIG. 4, is incorporated in the engine, especially in the big end of the connecting rod in a way the circular outside surface thereof is guided with a circular surface inside a mating housing or a big-end bore of the connecting rod under such constructional relation that a circular inside clearance S2 apart from an associated crankpin is larger in radial distance than a circular outside clearance S1 apart from a circular surface inside the big-end bore of the connecting rod: S2>S1. With the roller bearing cage of the present invention, since the cage 1 is finished flush across the overall circular outside surface 9 thereof as stated earlier, the circular outside surface 9 of the cage 1 is allowed to make contact in much large area with the circular surface inside the mating housing, on account of which the surface-to-surface contact stress can be significantly relieved to such extent that there is no metal-to-metal contact by virtue of the existence of lubricant. In forming the inside retainer lips 7 to the cage 1 for the roller bearing cage according to the present invention, inside raised ridges 21, shown in FIG. 7, extending towards the associated pocket 5 are first formed simultaneously with the rolling operation and, then, the inside projections 21 are finished into the inside lips 7 that are flush with the circular inside surface of the cage 1. The construction in which the inside retainer lips 7 are made flush with the circular inside surface 11 of the cage 1 helps render the rollers 2 harder to make any engagement with the inside retainer lips 7, compared with the prior roller bearing cage. The constructional feature that the rollers 3 are hard to make engagement with the inside retainer lips 7 results in keeping the cage 1 against any occurrence of seizing during revolution of the connection rod around the crankshaft, even in the high-speed engines, thereby realizing improvement in engine performance.

Figure 6:
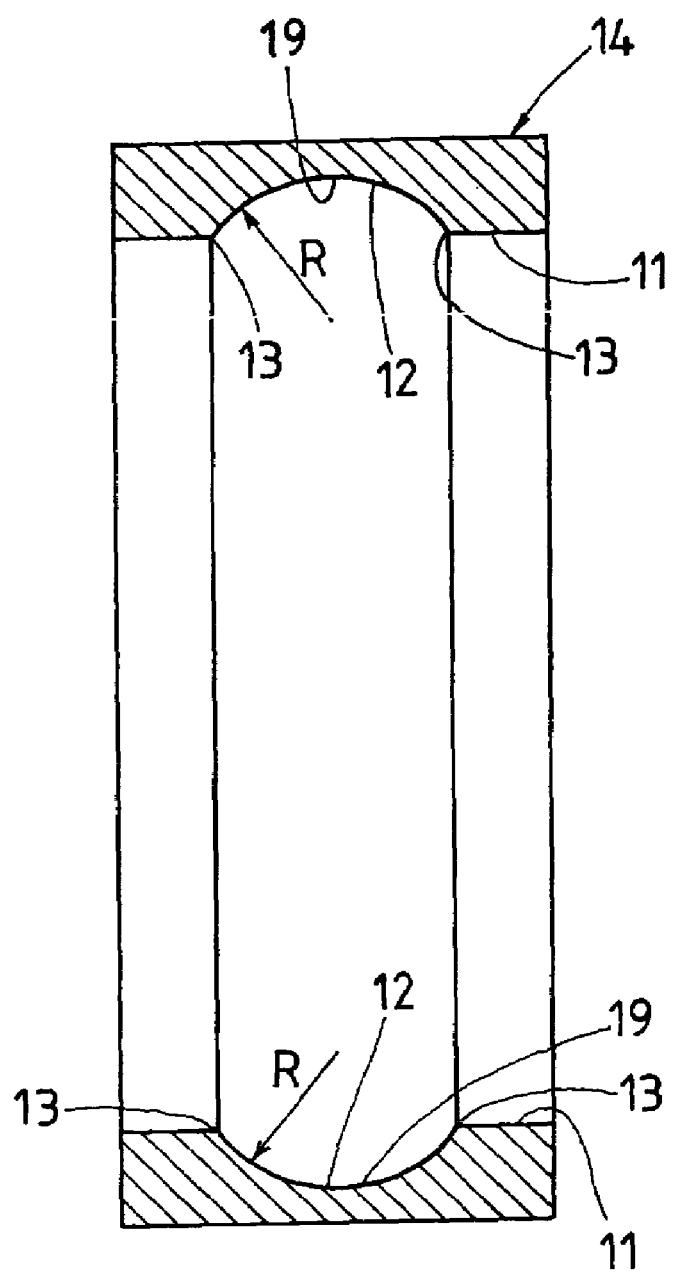
FIG. 6 is a view in transverse section illustrating a rolled product for further working in the block diagram of FIG. 5.
Figure 7:
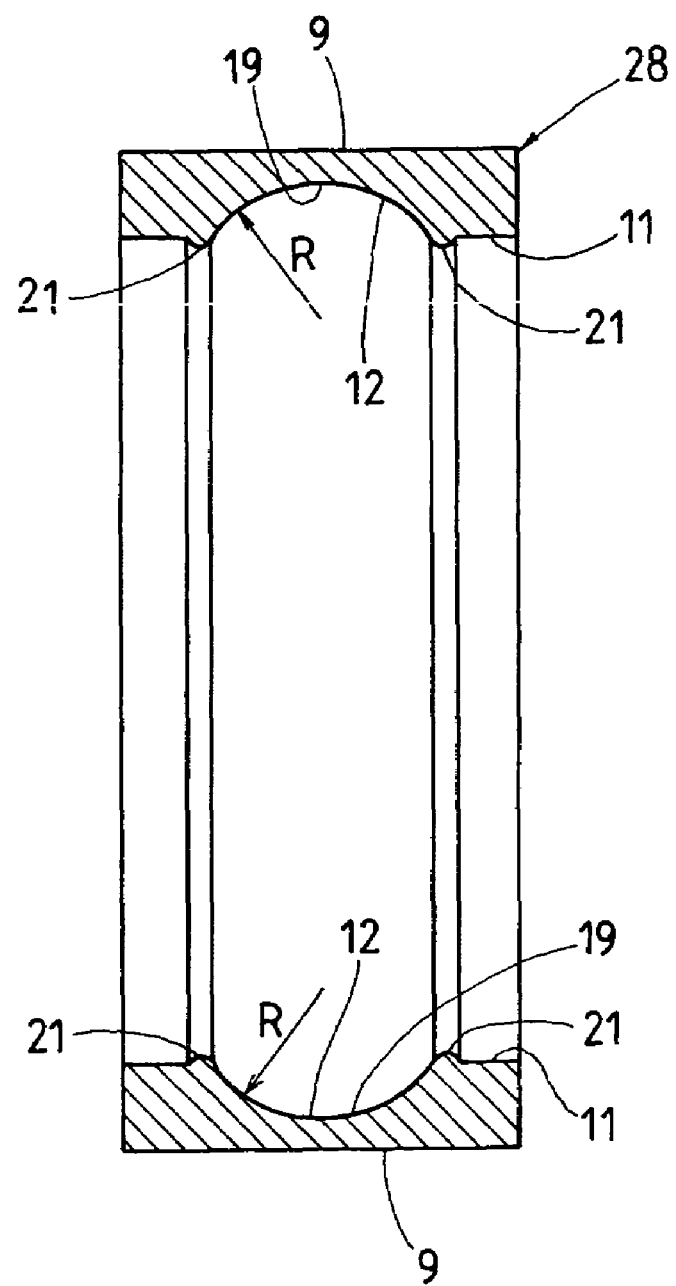
FIG. 7 is a view in transverse section illustrating another version of the rolled product for further working in the block diagram of FIG. 5.

How to produce the roller bearing cage of the present invention will be explained later with reference to FIGS. 5 to 7. The production method of the roller bearing cage of the present invention is distinctive by especially using rolling operations instead of usual turning operation on the lathes to make the cage 1.

With the production method of the roller bearing cage according to the present invention, any tubular material is first sheared at step 1 into a ring-like cage blank. The cage blank is processed at step 2 by rolling operation into a rolled product 14 having a circular recess 12 semicircular in transverse section as shown in FIG. 6. Subsequently, the rolled product 14 is worked at step 3 by punching operation so as to have more than one pocket 5 spaced circularly away from one another. At step 4, the punched product with pockets is further worked to make a formed product 28 in which raised ridges 21 preparatory to the inside retainer lips 7 to keep the rollers 2 against falling away are provided on the pillars 4 between two adjoining pockets 5. Of the raised projections, only the raised ridges 21 inside the cage are finished into the inside retainer lips 7 while the rest, not shown, outside the cage are finished into the outside retainer lips 6. Then, the turning operation is performed at step 5 for facing flat surfaces on the axially opposite sides of the formed product, thereby producing a turned product having a prescribed length in axial direction. The turned product faced in axial length is transformed at step 6 by heating into a heat-treated product high in durability. At step 7, the heat-treated product is turned on the lathe around the circular outside surface thereof into a final form of a prescribed outside circumferential dimension. The turned product of the prescribed outside circumferential dimension finally undergoes surface treatment at step 8 to provide a finished cage 1 enhanced in durability. The surface treatment is performed by, for example deposition of copper and/or silver over the cage to render the cage better in familiarity with the mating member, thereby getting hard to incur the seizing of bearing. The rollers 2 are inserted into the pockets 5, one to each pocket, from the circular inside surface of the cage 1 to complete the roller bearing cage.

With the rolled product 14 of cage contour given by the rolling operation, the recess 12 on the inside surface of the rolled product 14 is shaped to have the concaved surface 18, while the inside raised ridges 21 are formed in preparation for making the inside retainer lips 7 around the circular inside surface 11 of the cage 1. The roller bearing cage 1 in which the rollers 2 fit in the pockets 5 of the cage 1 for free rotation around their own axes without falling away by virtue of the inside retainer lips 7 is easy to incorporate it into the engine and also handle it. The inside and outside retainer lips 6, 7 all extend into their associated pockets 5 to such extent that tips of the retainer lips 6, 7 extending towards one another from any two pillars 4 adjacent to one another in circumferential direction of the cage 1 are apart from each other with leaving an interval just slightly less than the diameter of the roller 2. Thus, the rollers 2 are certainly kept against falling away out of the cage 1 whether inside or outside. As a result, the roller bearing cage making sure of keeping the rollers against falling away is easy to handle it upon installation of the roller bearing cage into mating housing in the engine. But once assembled into the mating equipment such as engines, the inside and outside retainer lips 6, 7 have no hand in protecting the rollers 2 from falling away.

The inside retainer lips 7, as shown in FIG. 3, are made on the pillars in a way extending sidewise in opposition circumferentially of the cage at corners or boundary areas 13 where the inside recess 12 merges with the axially opposite circular inside surfaces 11. The rolled product 14, as seen in FIG. 6, is made edged along circular areas, where inside recess 12 merges the axially opposite circular inside surfaces 11, preparatory to shaping the inside retainer lips 7. The inside retainer lips 7 may be made by drawing on any conventional alternative other than the shape rolling as stated earlier, including making the circular inside surface 11 jut partially out at the pillars 4 circumferentially of the cage 1 corresponding in reverse to depressions, not shown, on the circular inside surface 11. The inside retainer lips 7 are shaped at the pillars 4 by the following rolling procedures. The rolling operation is first performed to produce the rolled product 28 having the raised ridges 21 around the circular inside surface as shown in FIG. 7. Upon shape working after punching operation to make the pockets 5, shape rolling is carried out to squish the raised ridges 21 with yielding surfaces flush with the circular inside surface 11, thereby making the inside retainer lips 7 extending in opposition to one another from the associated pillars 4 circumferentially of the cage 1. The inside retainer lips 7 constructed as stated earlier, because of made flush with the circular inside surface 11, are far away from the rollers 2, so that there is no possibility of any interference with the rollers 2. In detail, the inside retainer lips 7 would be somewhat more radially inside than the inside retainer lips 7 in FIG. 4.

Figure 8:
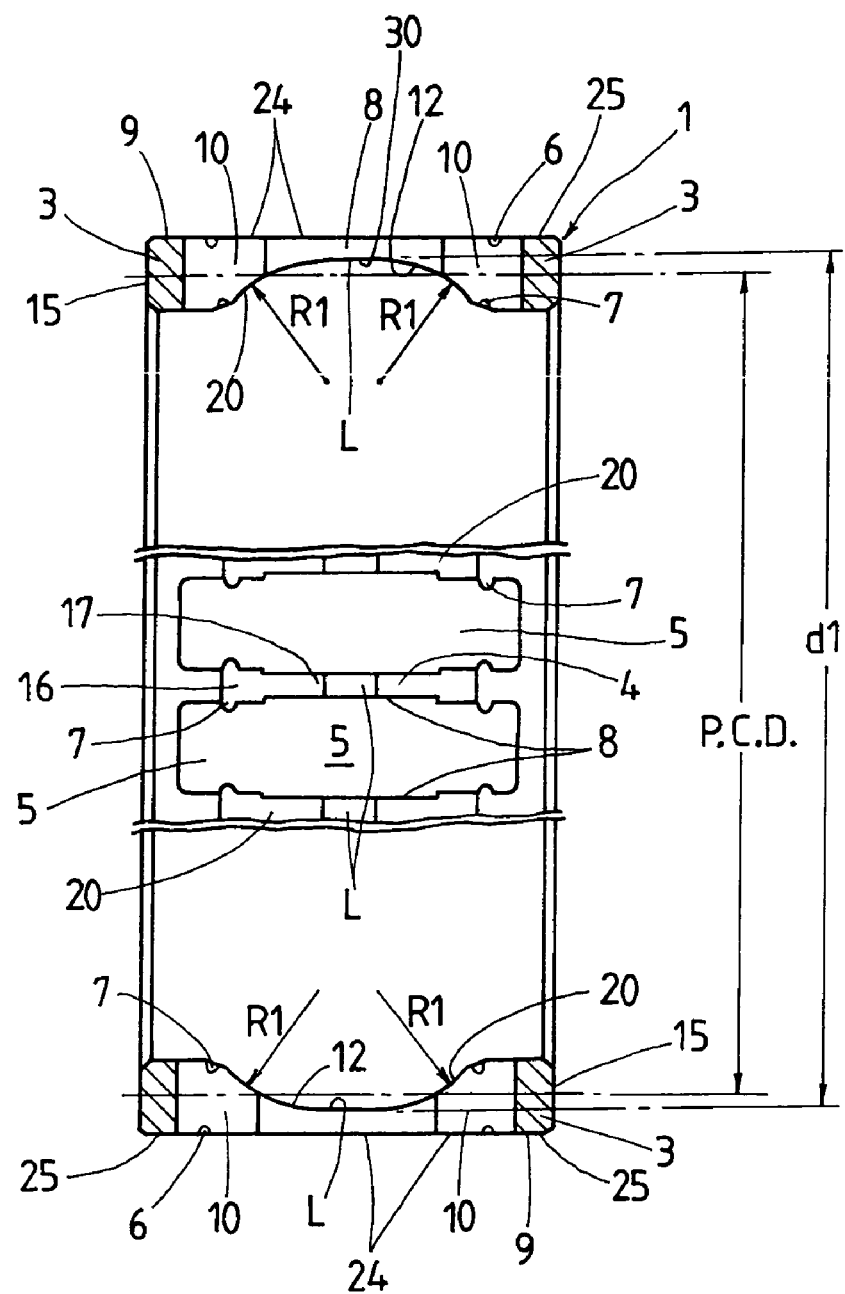
FIG. 8 is a view similar to FIG. 3 but showing a version other than the embodiment of FIG. 3.

Next, a second version of the roller bearing cage of the present invention will be explained with reference to FIG. 8. Unlike the first embodiment shown in FIG. 3 in which the concaved surface 18 defining the recess 12 on the inside surface of the pillar 4 is in line with an imaginary curve 19 having just one radius of curvature R when viewed in the transverse section in the axial direction to make rolling operation easier, the contour of a concaved surface 20 defining the inside recess 12 of the pillar 4, as shown in FIG. 8, is made into a composite semicircular surface 20 when viewed in the transverse section in the axial direction, in which a middle straight line L, or a flat plane, joins two imaginary curves having the same radius of curvature R1. In the second version, as with the first embodiment stated earlier, the diametral distance d1 passing through the axial center 0 to join the opposite bottoms of the inside recesses 12 is made larger than the pitch circle distance P.C.D. of the roller bearing cage. With the second version discussed now, the composite semicircular surface 20 defining the inside recess 12 is made to show an elliptic curve when viewed in transverse section in the axial direction, or a composite curve where the middle straight line L joins two imaginary curves having the same radius of curvature R1. An alternative contour of the concaved surface 20 in the inside recess 12 made in semi-elliptic curve when viewed in transverse section, although not shown, would be expected to work as well as the curved surface stated just above.

Figure 9:
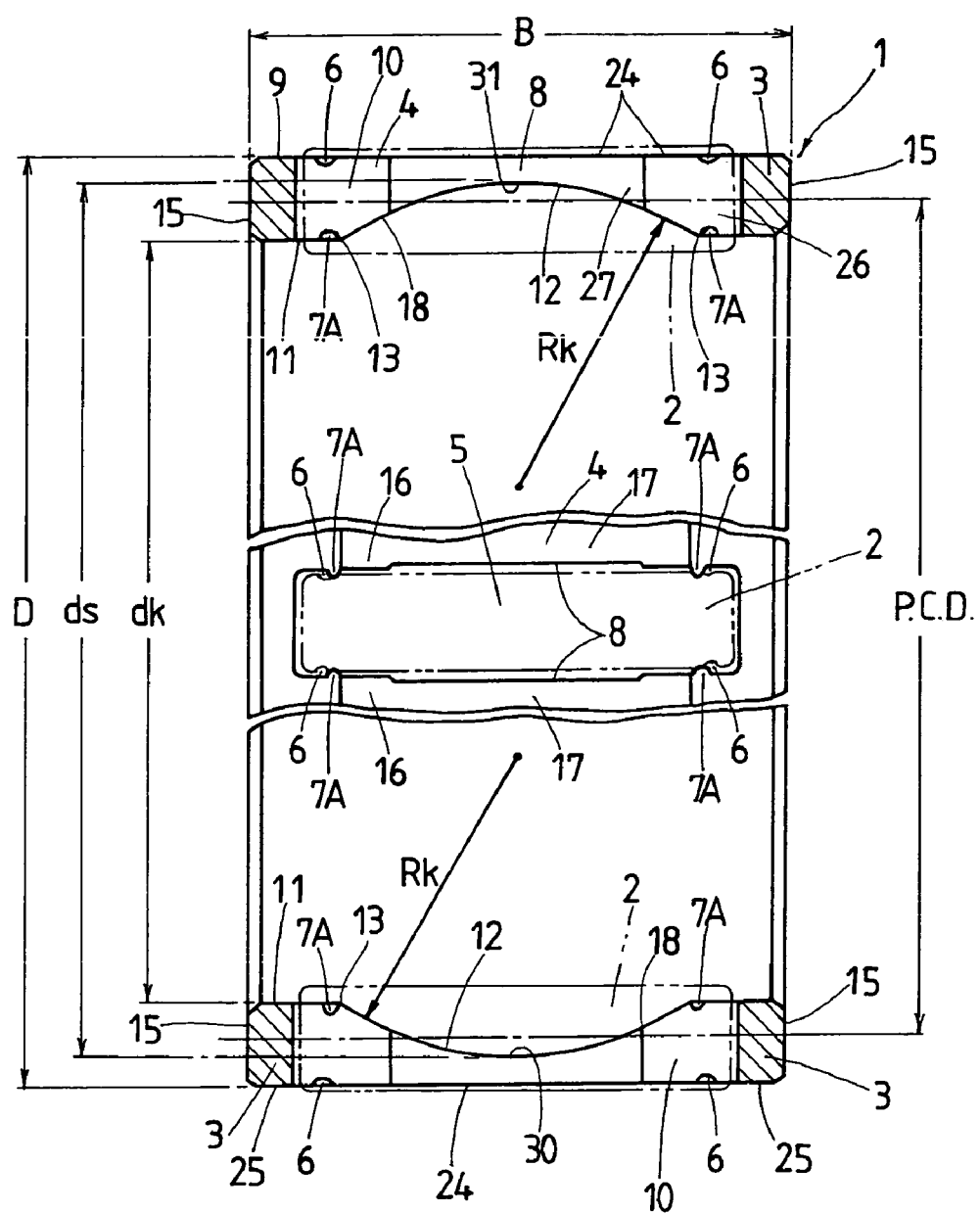
FIG. 9 is a view similar to FIG. 1 but showing another version of the pocket to explain how to retain a roller in the roller bearing cage of the present invention.
Figure 10:
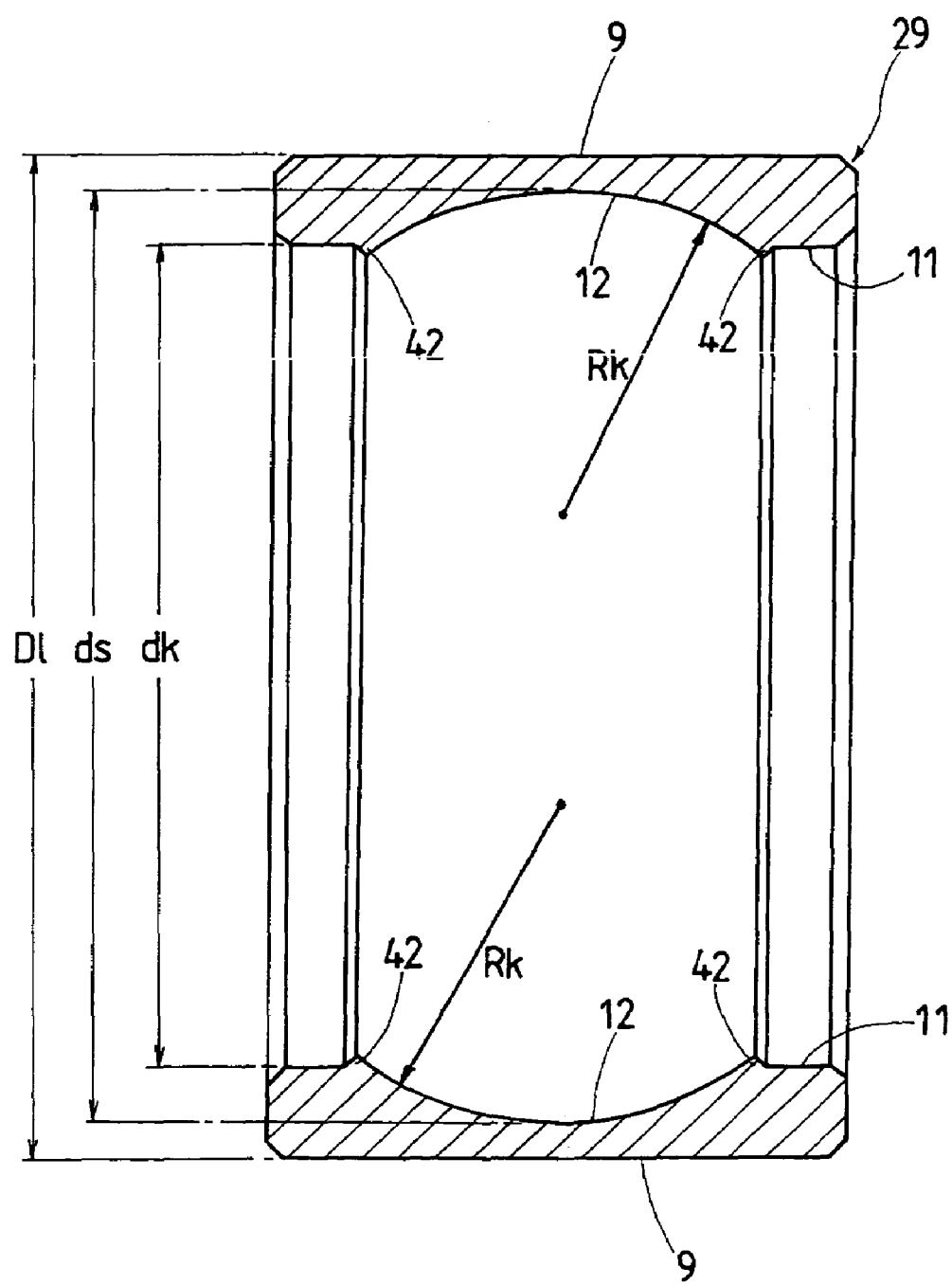
FIG. 10 is a view in transverse section showing a cage blank prepared by turning operation for further working to finish the roller bearing cage of FIG. 9.

A third version of the roller bearing cage of the present invention will be described later with reference to FIGS. 9 to 14. A cage 1 in the third version of the roller bearing cage is turned on the lathes, while the cages in the first and second versions are worked by rolling operation. Referring first to FIGS. 9 and 10, there is shown the third version of the present invention. Most of the components in the third modification of the roller bearing cage according to the present invention are substantially the same in shape and construction as the first embodiment previously described with reference to FIGS. 1, 2 and 4. To that extent, the components and parts have been given the same reference characters, so that the previous description will be applicable.

It was found that the third version of the roller bearing cage in which the concaved surface 12 defining the inside recess 12 was made on the circular inside surface 11 of the cage 1 by using the turning operation could be used as well as other embodiments stated earlier, in which the concaved surface 12 was made by using the rolling operation. The third version of the roller bearing cage of the present invention is also easier to handle it and install it in the mating housing. Moreover, the third version is also made with the outside and inside retainer lips 6, 7 to keep the rollers 2 against falling away from the cage 1. The third version is further favorable for carrying the heavy loads imposed by the high-speed revolution of the modern engines. The circular outside surface 9 of the cage 1 save for specific areas where the pockets 5 are made open is made flush or even across the overall axial length thereof, whereas the circular inside surface 11 of the cage 1, unlike the conventional cage configuration, is worked using turning operation on the lathes to form the inside recess 12 of arched contour defined by the concaved surface 18 when viewed in transverse section in the axial direction. The circular inside surface of the cage 1 of the third version in FIG. 9 is virtually identical with that shown in FIG. 3, except for different in working operation. In FIG. 9, the roller 2 fit into the pocket 5 is indicated with a dash-and two-dot line. The concaved surface 18 defining the inside recess 12 is formed by following an imaginary curve having just one radius of curvature Rk when viewed in the transverse section in the axial direction of the cage 1. The imaginary circle lying circumferentially on successive deep centers of the inside recesses 12, or the bottoms of the inside recesses 12 has a diametral distance ds, which extends radially outside beyond the pitch circle distance P.C.D. of the roller bearing cage. Axially opposite ends of the cage 1 serve as the guide surfaces 10 on which the roller 2 is carried for free rotation. Just one radius of curvature Rk is set as large as possible so long as the formation of the inside retainer lip 7 is permitted. With the roller bearing cage in which the concaved surface 18 defining the inside recess 12 is formed by following an imaginary curve having just one radius of curvature Rk when viewed in the transverse section, the pillar 4 varies gradually in transverse sectional area towards the center of the pillar in axial direction, helping alleviate the surface-to-surface contact stress over the circular outside surface 9 of the cage 1. The cage 1 in the third version lessened to 99.8% in weight while retaining the stiffness, compared with the prior roller bearing cage of the gate type disclosed in the senior patent application of common assignment.

Figure 12:
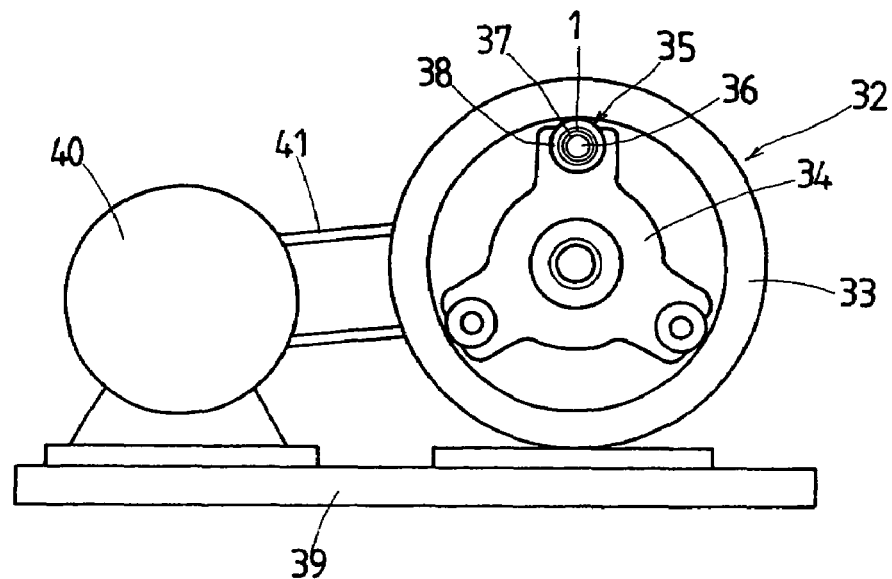
FIG. 12 is a schematic view of a centrifugal load testing machine used for assessment of the roller bearing cage of FIG. 1.
Figure 13:
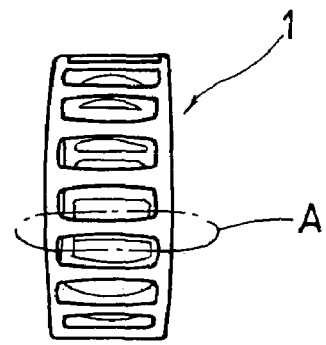
FIG. 13 is a schematic sketch of the roller bearing cage to be assessed by the centrifugal load tester of FIG. 12.

A testing machine shown in FIG. 12 was used to assess the surface-to-surface contact stress imparted to the cage 1 for the roller bearing cage in FIG. 13. A test result is presented in FIG. 14 in the form of photography. The testing machine schematically shown in FIG. 12 is a kind of centrifugal load testing machine 32, which has a ring drum 33 and a driving motor 40, mounted on a machine bed 39. The driving motor 40 actuates a rotor 34 through a V-belt drive 41. The testing machine 32 has a construction envisaged using it for the rod "big-end" of the connecting rod. With the testing machine 32 constructed as stated above, the rotor 34 installed inside the ring drum 33 has planet receptacles 35 to receive therein the bearings to be assessed. The planet receptacles 35 are positioned at regular intervals, for example at trisected intervals in FIG. 12, around the circular outside surface of the rotor 34 in a way coming into rolling contact with a circular inside surface of the ring drum 33. The planet receptacles 35 are each composed of an inner ring 37 fastened to the rotor 34 against rotation, but allowed to move in radial direction of the rotor 34, and an outer ring 38 spaced away from the inner ring 37 to fit the roller bearing cage between them, while making rolling contact with the circular inside surface of the ring drum 33. The roller bearing cage fit in the testing machine 32 experiences high revolution and heavy load.

Figure 14:
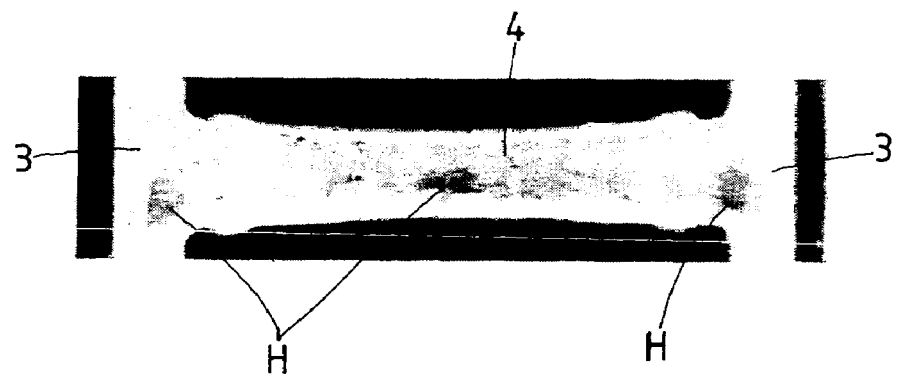
FIG. 14 is an enlarged fragmentary view of a part of a circular outside surface of the cage in FIG. 13.

The surface-to-surface contact stress imparted against the circular outside surface 9 of the cage 1 was well determined in terms of calculations of results given by the testing machine 32 constructed as stated earlier. The test of the roller bearing cage carried out by the testing machine 32 is the point of giving visual assessment of the surface-to-surface contact stress imparted on the cage 1. Observations were carried out with varying rpm for 1000 rpm in the range of from 5000 rpm to 10000 rpm every one hour. FIG. 14 is an enlarged fragmentary view of an axial area, encircled with sign A, of the cage 1 of FIG. 13. In detail, FIG. 14 shows surface conditions in enlarged appearance of a part of a circular outside surface of the cage. As apparent from FIG. 14, the circular outside surface of the cage, although dotted with slightly blackish areas H, appears uniform axially over the pillar 4 across the annular members 3. This observed appearance verifies that the cage 1 of the roller bearing cage constructed according to the present invention distributes the surface-to-surface contact stress uniformly or evenly over the circular outside surface 9, helping prevent occurrence of the seizing of bearing, even under high revolution of the engine.

The third version of FIG. 9 further features the formation of inside retainer lips 7A. Referring now to FIG. 10, there is shown a cage blank 29 before subjected to further turning operations on the lathes to produce the cage 1, followed by the punching operation to make pockets therein. The cage blank 29 has been previously turned on the lathes to have an outside diameter D1 and circular inside raised ridges 42. The cage blank 29 worked on the lathes is then processed by the punching operation to make the pockets 5. Subsequently, a further working operation is applied after the punching operation to the cage blank 29 to flatten the circular inside raised ridges 42 into inside retainer lips 7A, which are flush with the circular inside surface 11 of the cage 1. That is, the cage 1 of the third version is made by the following sequence of working steps. The cage blank made previously with the circular inside raised ridges 42 by the turning operation is processed by the punching operation to open the pockets 5. Thereafter, the inside raised ridges 42 are pressed at the associated pillars 4 into the inside retainer lips 7A, which are flush with the circular inside surface 11 of the cage 1. Eventually, there is provided the cage 1 designed to have an outside diameter D, axial width B, concaved surface 18 falling in line with an imaginary curve having a radius of curvature Rk, circular inside surface 11 of diametral distance dk, diametral distance ds of an imaginary circle lying circumferentially on diameter P.C.D. of pitch circle.

Figure 11:
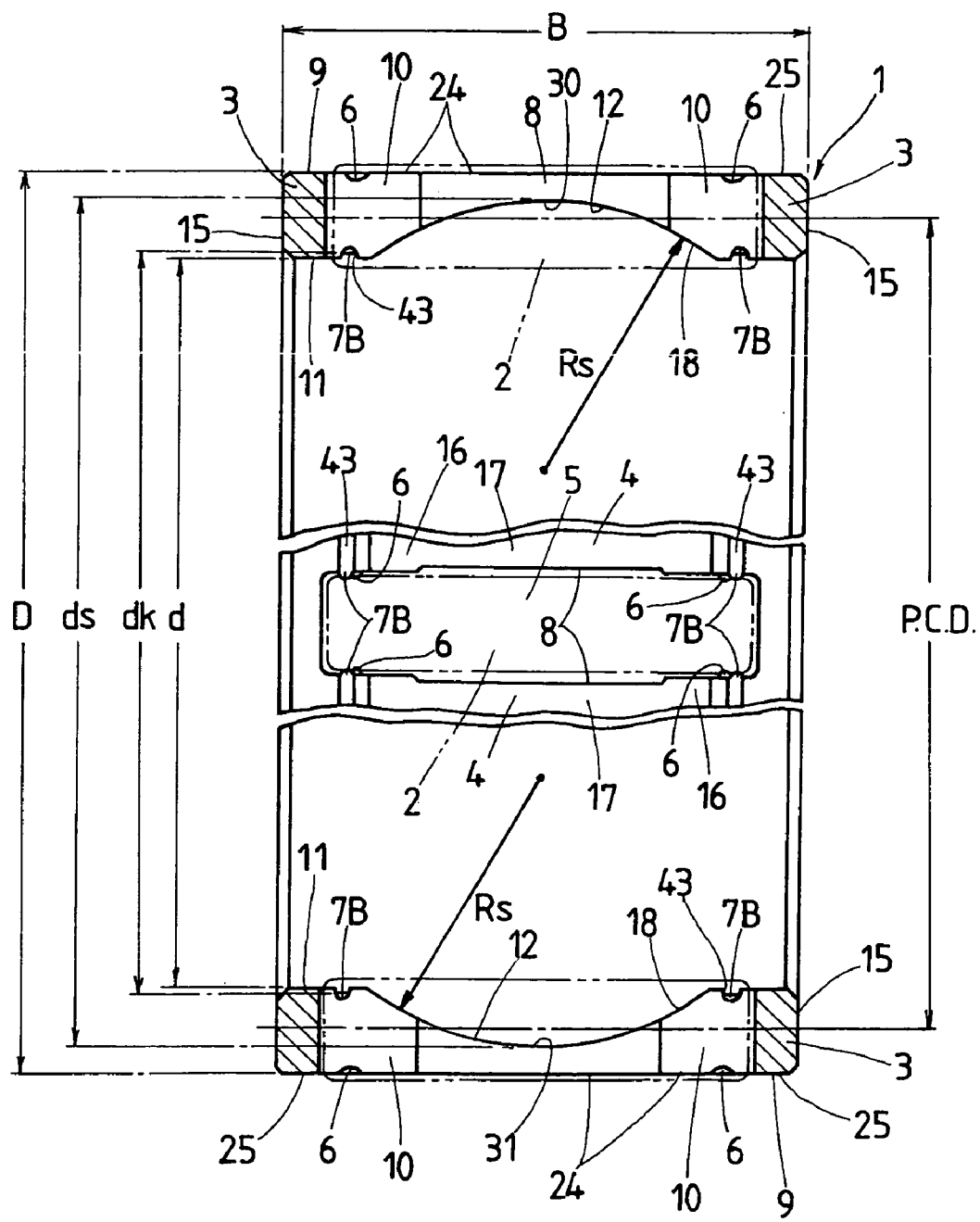
FIG. 11 is a view in transverse section taken along an axial direction, partially broken away, of another version of the roller bearing cage according to the present invention as seen looking into the inside thereof.

Inside retainer lips 7B made inside the cage 1 of FIG. 11 is different in working method from the inside retainer lips 7A in the cage 1 of FIG. 9. The circular inside surface 11 is first pressed to create circular depressions 43 with yielding projections extending into the associated pockets. Then, the projections is shaped into the inside retainer lips 7B. Thus, the squeezing operation is carried out to create the circular grooves 43 depressed radially outwards from the diameter d of the circular inside surface 11 to the depth of a diameter dk of a circular bottom of the groove 43. In this version of the cage, excess metals are needed at the axially opposite ends to make it possible to create the circular depressions 43. A constructional feature of the cage 1 of FIG. 11 resides in that the radius of curvature Rs is made less than the radius of curvature Rk of FIG. 9. That is to say, the concaved surface 18 defining the inside recess 12 made in the cage 1 has the radius of curvature Rk that is less in size than Rs: the relation between them is Rk>Rs. The larger the radius of curvature for the concaved surface 18 would result in weight reduction, albeit slightly. With the cage 1 of FIG. 9, moreover, the radius of curvature dk of the imaginary circle touching the inside retainer lips 7A of the cage 1 is larger than the diameter D of the circular inside surface of the cage 1, compared with the cage 1 of FIG. 11. This means that the cage 1 of FIG. 9 may be made more slender in thickness including the inside retainer lips 7A than the cage 1 of FIG. 11.

The inside retainer lips 7 in the cage 1 of FIG. 9 are made on the pillars at the axially opposite corners 13 in a relation flush with the circular inside surface 11 of the cage 1. As a result, the cage 1 of FIG. 9 lessened to 95.7% in weight, compared with the cage 1 of FIG. 11. The less the weight of the cage is, the less the surface-to-surface contact stress exerted on the circular outside surface 24 of the cage 1 due to the centrifugal force is, so that the roller bearing cage may be constructed to be hard to incur the seizure of bearing even used in the high revolution of the engines. With the cage 1 of FIG. 11, moreover, the concaved surface 18 defining the inside recess 12 is formed to have just one radius of curvature Rs, so that the surface-to-surface contact stress imparted on the circular outside surface 24 of the cage 1 may be rendered more uniform across the overall surface.

Figure 15:
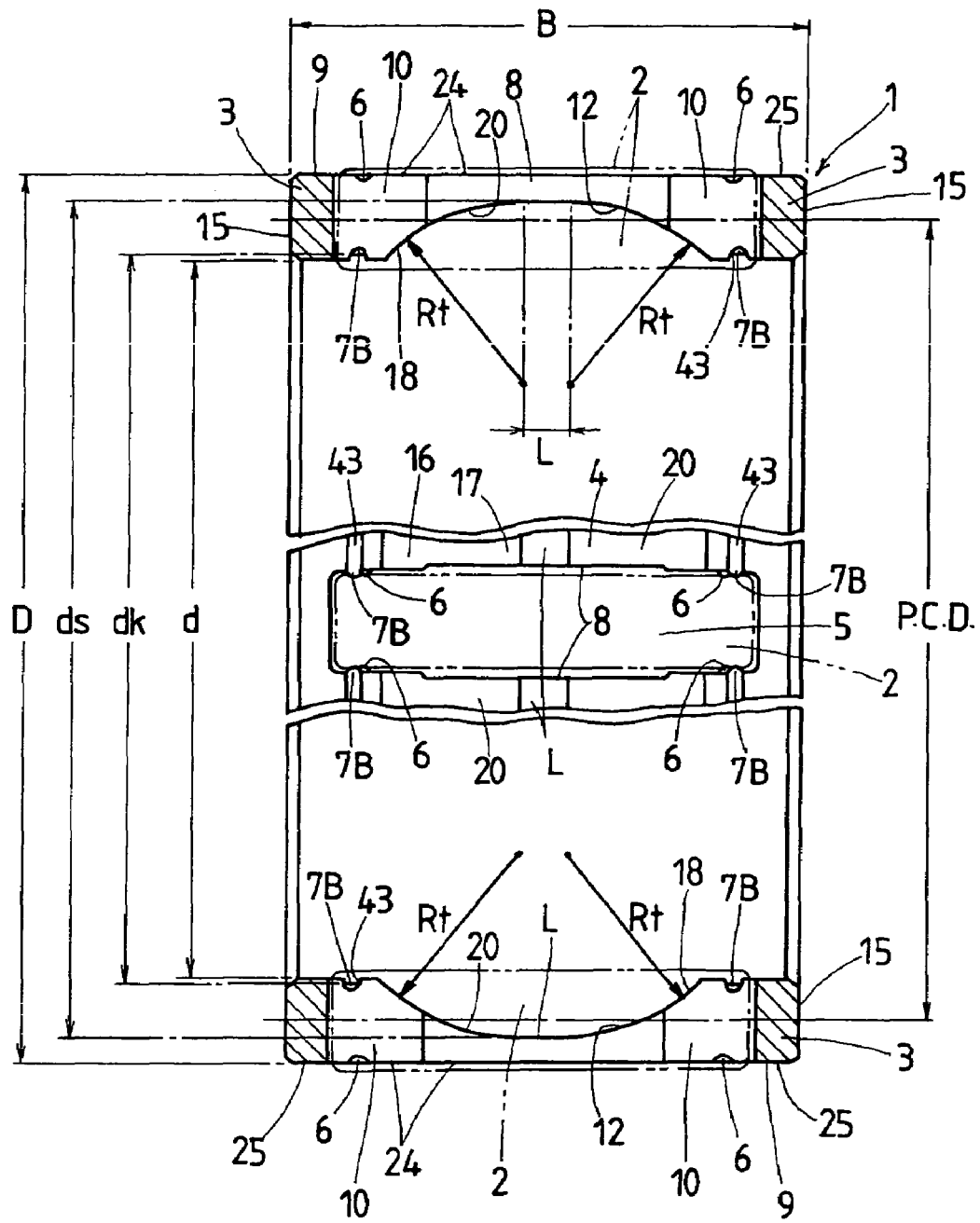
FIG. 15 is a view in transverse section taken along an axial direction, partially broken away, of a further another version of the roller bearing cage according to the present invention as seen looking into the inside thereof.

Finally referring to FIG. 15, there is shown a fourth embodiment of the roller bearing cage of the present invention. The fourth embodiment of the roller bearing cage features that a cage 1 is formed by using the turning operation on the lathes, as opposed to the first and second embodiments processed by using the rolling operations.

Unlike the inside concaved surfaces 18 in FIGS. 9 and 11 made to have just one radius of curvature, an inside concaved surface 18 in the fourth embodiment is made into a composite concaved surface 20 when viewed in the transverse section in the axial direction, in which a middle straight line L, or a flat plane, joins two imaginary curves 18 having the same radius of curvature e Rt. The roller bearing cage of the fourth embodiment also has inside retainer lips 7B, which are expected to provide the same effect or function as in the first to third embodiments. With the roller bearing cage of the fourth embodiment, it is preferable that the radius of curvature Rt of the concaved surface 18 is for example 6 mm and the middle straight line is made in length corresponding to the diameter of the roller.

While the present invention has been described in its preferred embodiments, it is to be understood that the words which have been used are words of description rather than limitation and that changes within the purview of the appended claims may be made without departing from the true scope and spirit of the invention in its broader aspect.

What is claimed is:

1. A roller bearing cage; comprising a cage made up of a pair of annular members arranged in a way spaced axially apart from each other and extended circumferentially in parallel with each other, pillars integral with the annular members and positioned at regular intervals around circular surfaces of the cage to provide pockets between any two adjacent pillars, and rollers received in the pockets, one to each pocket;

wherein a circular outside surface of the cage is made even across an overall length in the axial direction of the cage while a circular inside surface of the cage is made circularly inside recessed at a middle portion in an axial direction of the cage to provide a configuration of a concaved surface, wherein the concaved surface is made around the circular inside surface of the cage in such a manner that a diametral dimension between diametrically opposite bottoms of the concaved surfaces is larger than a diametral dimension of a pitch circle of the cage, and wherein the pillars each include axially opposite thick portions and a portion lying between the axially opposite thick portions which gradually decrease in thickness on sides thereof, so that guide surfaces against which the associated roller is carried for rotation is constituted in part by the thick portions and in part by the portion lying between the thick portions.

2. A roller bearing cage constructed as defined in claim 1, wherein the concaved surface defining the circular inside recess is made in line with an imaginary circle having just one radius of curvature when viewed in longitudinal section along an axial direction of the cage.

3. A roller bearing cage constructed as defined in claim 1, wherein the pillars of the cage have outside retainer lips to keep the rollers against falling away outwards and inside retainer lips to keep the rollers against falling away inwards.

4. A roller bearing cage constructed as defined in claim 3, wherein the outside retainer lips have outside surfaces that are made flush with the circular outside surface of the cage.

\* \* \* \* \*